United States Patent [19]

Moravnik

[11] Patent Number: 4,471,763
[45] Date of Patent: Sep. 18, 1984

[54] SOLAR ENERGY CONCENTRATOR
[75] Inventor: Zvi Moravnik, Netanya, Israel
[73] Assignee: Solar Power Laboratories, Ltd., Hadera, Israel
[21] Appl. No.: 395,981
[22] Filed: Jul. 7, 1982

Related U.S. Application Data

[63] Continuation-in-part of Ser. No. 184,020, Sep. 4, 1980, Pat. No. 4,397,302.
[51] Int. Cl.$^3$ .............................................. F24J 3/02
[52] U.S. Cl. ................................. 126/439; 126/440
[58] Field of Search ..................... 126/438, 439, 440; 350/286, 288

[56] References Cited
U.S. PATENT DOCUMENTS
4,263,892  4/1981  Pavlak ................................. 126/438
4,282,862  8/1981  Soleau ................................. 126/440

Primary Examiner—Samuel Scott
Assistant Examiner—G. Anderson
Attorney, Agent, or Firm—Auslander & Thomas

[57] ABSTRACT

Non-focusing solar energy concentration apparatus comprising one or more solar energy absorbing surfaces defining a first area and solar energy transmissive material disposed adjacent the absorbing surfaces and defining an incident surface having a second area greater than the first area, the incident surface being arranged to receive incident radiation from the sun, the solar energy transmissive material also defining a second surface for transmitting radiation to the at least one absorbing surface, the transmissive material having an index of refraction and a configuration selected to provide total internal reflection at the incident surface of radiation incident on the incident surface within a predetermined azimuthal range.

5 Claims, 8 Drawing Figures

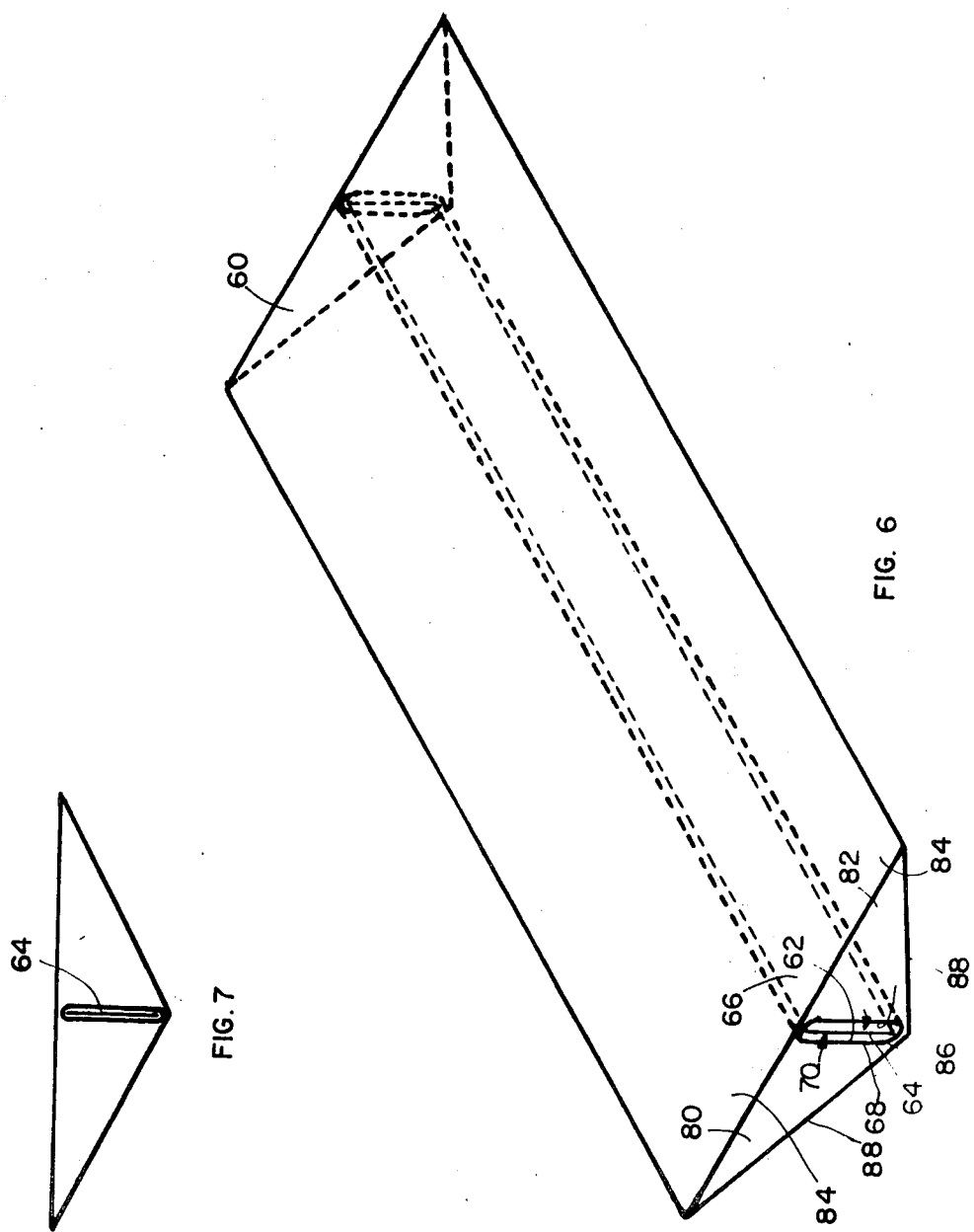

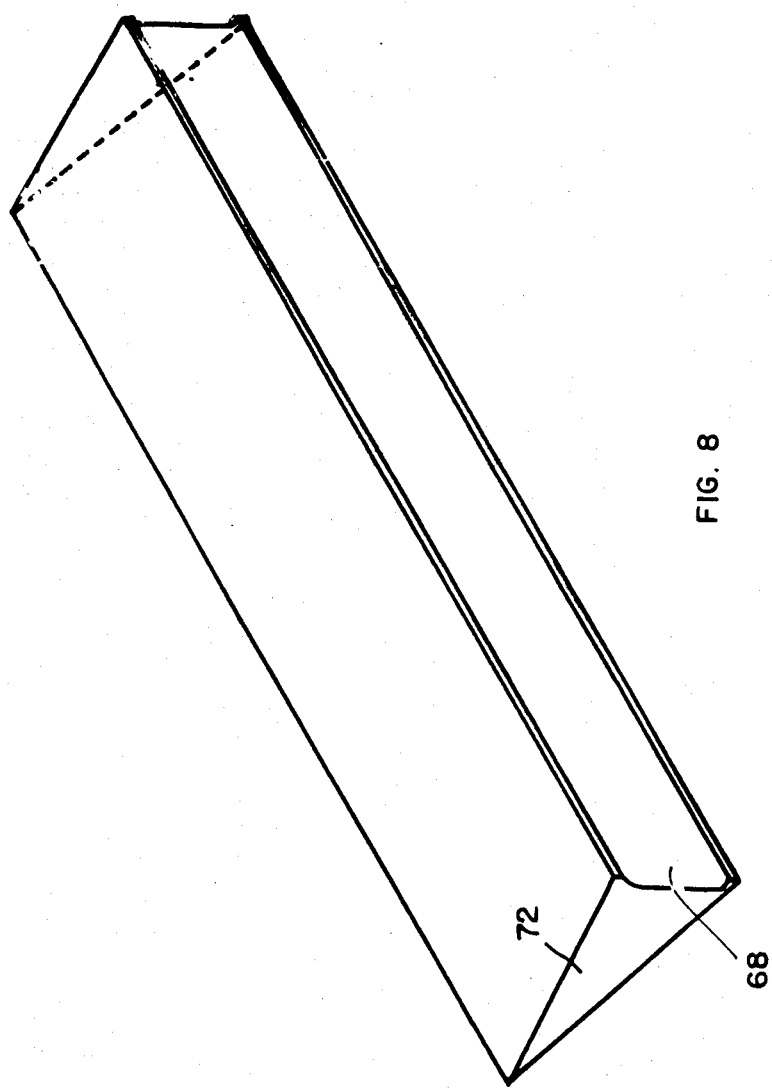

SOLAR ENERGY CONCENTRATOR

REFERENCE TO RELATED APPLICATIONS

This is a continuation-in-part of U.S. patent application Ser. No. 184,020, filed Sept. 4, 1980, now U.S. Pat. No. 4,397,302.

FIELD OF THE INVENTION

The present invention relates to solar energy concentrators and more particularly to non-focusing solar energy concentrators.

BACKGROUND OF THE INVENTION

A great variety of solar collectors are presently known and in use. The most popular construction is the flat plate collector which is normally employed in solar water heating installations. While the flat plate collector is useful for producing a relatively low temperature heat output in the vicinity of 60°–70° C., at higher temperatures it has extremely low efficiency. As a result, the flat plate collector is not suitable for generating steam.

There exist a number of important applications, such as power generation where the provision of high output temperatures is required. Current technology for producing such temperatures in solar collectors calls for a focussing collector in which an image of the sun is focussed on a solar absorber. Due to the movement of the sun during the day, tracking apparatus is generally required to keep the sun's image on the absorber surface.

Tracking apparatus is relatively expensive and cumbersome and requires continuing maintenance to maintain its operational efficiency. For this reason solar collector apparatus employing mechanical tracking has not gained market acceptance. Also, focussing collectors do not employ diffused radiation.

The present invention seeks to overcome disadvantages of the prior art solar collection apparatus and to provide solar collection apparatus which provides a high temperature output at relatively high efficiency and without requiring solar tracking apparatus, and which employs diffused radiation as well.

U.S. Pat. No. 4,162,824 discloses a non-imaging radiant energy collector and concentrator which employs elongate curved mirrors. U.S. Pat. No. 4,141,340 discloses a solar energy collector employing upstanding elongate absorber panels interdigitated with inclined mirrors. This configuration provides practically no concentration and appears to require a tracking device for efficient operation.

U.S. Pat. No. 4,069,812 describes a solar concentrator and energy collection system which operates on refraction and would appear to require the use of a tracking system for efficient operation. It does not absorb diffuse radiation.

None of the above-described references employ total internal reflection for concentrating solar radiation onto an absorber.

U.S. Pat. No. 4,154,219 describes a prismatic solar reflector and method of solar tracking which defines a focussing collector and employs total internal reflection of a prism for focussing light onto an absorber. The prism is characterized in that light enters and leaves through the same surface. The apparatus does not employ diffuse solar radiation. The prisms are spaced from the absorber surface. A similar disclosure is to be found in "Prisms with Total Internal Reflection as Solar Reflectors" by Ari Rabl in Solar Energy Vol. 19, pp. 555–565, Pergamon Press 1977. These disclosures may be readily distinguished from the present invention as described hereinbelow in that they relate to focussing collectors, rather than to non-focussing collectors which are the subject of the present invention.

U.S. Pat. No. 4,056,094 discloses a solar heat collector which employs total internal reflection for reflection but not for concentration.

U.S. Pat. No. 4,045,246 describes a two-stage concentrator and employs a liquid with an index of refraction higher than that of air. This liquid is not used to provide total internal reflection.

German Offenlegungsschrift No. 2827 708 describes a solar energy concentrator and collector employing total internal reflection but wherein the incident surface is not perpendicular to the absorber surface. The configuration shown in this German Offenlegungsschrift is designed to provide the highest concentration ratio of the area of the incident surface to the area of the absorber surface. It does not, however, enable a back-to-back construction utilizing both surfaces of an absorber plate and thus requires, for a given area, twice as many absorber plates as are required in the present invention. Additionally, significant heat losses are encountered due to disclosed construction wherein the back surface of the absorber plate is open to the atmosphere.

U.S. Pat. No. 4,024,852 shows a solar energy reflector collector including an absorber plate whose two surfaces define solar energy absorbing surfaces. The structure employed is that of an elongate collector of parabolic cross section.

U.S. Pat. No. 4,003,364 discloses a solar heating system having a complex cross section including fins having a plurality of surfaces and defining a fluid path therethrough.

SUMMARY OF THE INVENTION

In accordance with a preferred embodiment of the present invention there is provided non-focusing solar energy concentration apparatus comprising a solar energy absorbing plate defining first and second parallel back-to-back solar energy absorbing surfaces having a low emissivity coating and arranged in communication with fluid flowing adjacent thereto for heat transfer to the fluid, each solar energy absorbing surface having a first surface area;

solar energy transmissive material disposed adjacent the first and second parallel absorbing surfaces, the solar energy transmissive material defining on respective first and second sides of the plate, first and second incident surfaces arranged to receive incident radiation from the sun, each of the first and second incident surfaces having a surface area which is greater than the first surface area, the solar energy transmissive material also defining first and second adjacent surfaces disposed in spaced adjacent relationship to the first and second parallel absorbing surfaces for transmitting radiation thereto, the separations between the first and second adjacent surfaces and the first and second absorbing surfaces defining a channel for passage of fluid therebetween;

the first and second incident surfaces lying perpendicular to the first and second absorbing surfaces;

the transmissive material having an index of refraction and a configuration selected to provide total internal reflection at the first and second incident surfaces of radiation incident on the incident surfaces within a predeter...ined azimuthal range;

the plate being surrounded externally along the absorbing surfaces by the transmissive material, thus providing thermal insulation for the plate.

Additionally in accordance with an embodiment of the invention, the transmissive material is integrally formed as a single unit defining a central bore in which the plate is located and which defines the fluid channel.

Alternatively in accordance with an embodiment of the invention, the transmissive material is formed of two identical halves, each of a generally triangular configuration.

According to a preferred embodiment of the invention, each of the identical halves has an incident surface of width between one and two inches and the plates have absorbing surfaces of less than one inch.

Further in accordance with an embodiment of the invention, the incident radiation includes diffuse radiation.

Additionally in accordance an embodiment of the invention, the concentration apparatus also comprises reflectors associated with a surface of the transmissive material for directing radiation towards the absorbing surface.

Further in accordance with an embodiment of the present invention, the incident surface defines at least one surface which is generally transparent to incident solar radiation from the atmosphere and substantially relfective of radiation reflected within the transmissive material.

BRIEF DESCRIPTION OF THE DRAWINGS

The invention will be more fully understood and appreciated from the following detailed description taken in conjunction with the drawings in which:

FIG. 6 is a pictorial illustration of an alternative embodiment of solar energy collection apparatus constructed and operative in accordance with the present invention;

FIG. 7 is an end view illustration of the apparatus of FIG. 6; and

FIG. 8 is a pictorial illustration of a modular one-half portion employed in constructing the apparatus of the present invention, as shown in FIGS. 6 and 7.

DETAILED DESCRIPTION OF THE INVENTION

Figure 1:
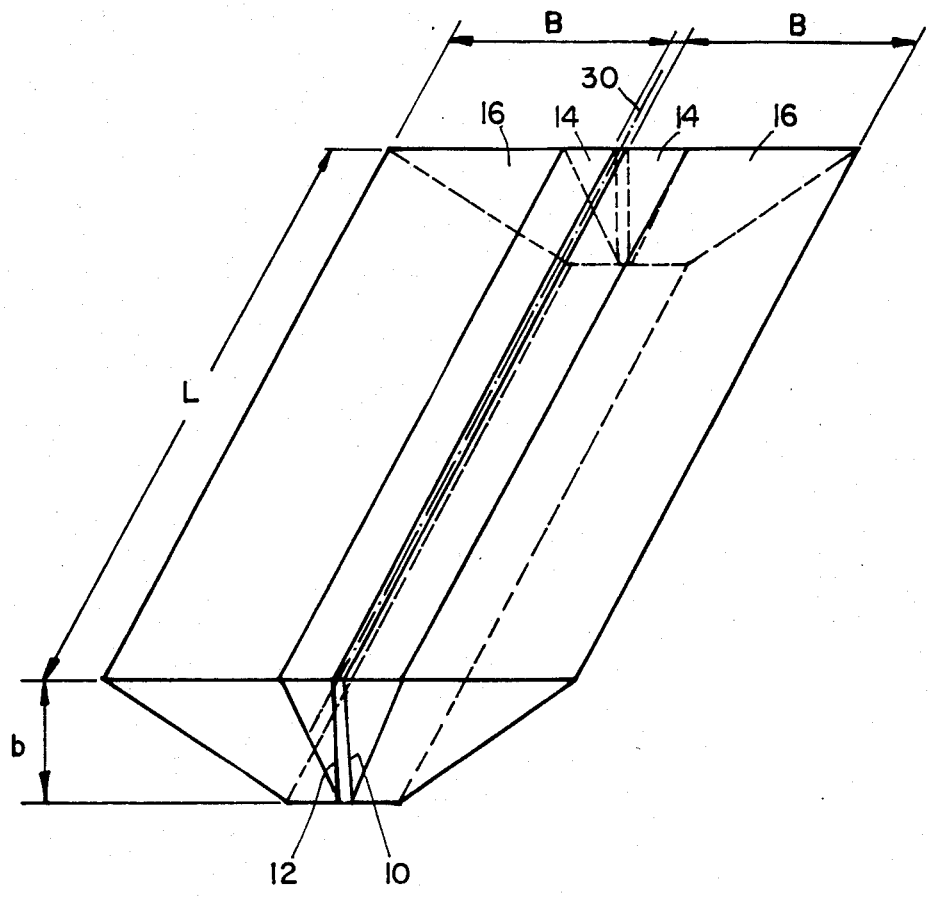
FIG. 1 is a pictorial illustration of solar energy collection apparatus constructed and operative in accordance with an embodiment of the present invention.
Figure 2:
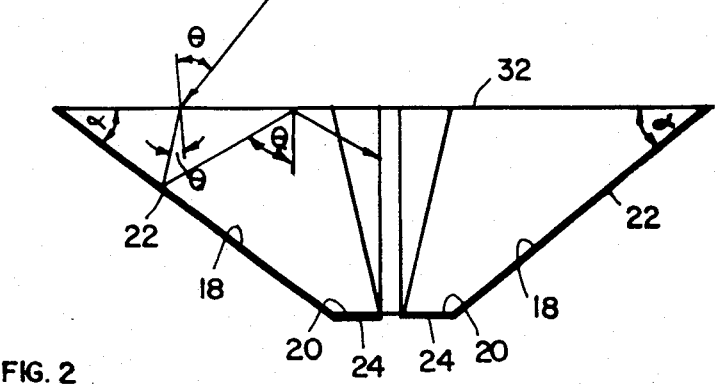
FIG. 2 is a sectional illustration of the embodiment of FIG. 1.

Referring now to FIGS. 1 and 2 there is seen a preferred embodiment of solar energy concentration apparatus constructed and operative in accordance with an embodiment of the present invention. In accordance with the illustrated preferred embodiment, the collection apparatus comprises first and second elongate solar absorber plates 10 and 12 disposed in generally spaced back to back relationship. Solar absorber plates 10 and 12 typically comprise metal strips having a low emissivity coating, such as black paint and are arranged in communication with flowing fluid in a manner not illustrated herein for heat transfer thereto. The exact construction of the heat exchanger which is in thermal communication with the solar absorber plates 10 and 12 may be entirely conventional.

Disposed adjacent each solar absorber plate is an elongate volume 14 of a material having an index of refraction greater than that of air. According to a preferred embodiment of the invention, volume 14 contains carbon disulfide ($CS_2$) having an index of refraction of approximately 1.65. Volume 14 may be defined by walls of a solar energy transmissive material such as glass or perspex, and has a triangular cross section.

Disposed adjacent volume 14 is a second elongate volume 16 of a cross section which together with the cross section of volume 14 defines a trapezoid. Volume 16 typically comprises a material having an index of refraction less than that of the material contained in volume 14. According to a preferred embodiment of the invention, volume 16 contains water having an index of refraction of 1.33. Volume 16, similarly to volume 14 may be defined by walls of glass or any other suitable material. Alternatively, solid materials may fill volumes 14 and 16 and thus no walls are required. Materials such as plastics may be employed.

Arranged along the underside and bottom surfaces 18 and 20 of volume 16 are reflecting mirrors 22 and 24 having their reflecting surfaces facing towards volume 16.

It will be appreciated by persons skilled in the art that the geometry of volumes 14 and 16 and the indices of refraction thereof are selected in order to maximize the efficiency of the solar energy collector apparatus at a desired output temperature for a desired location and solar radiation conditions. The criteria for such selection will be described and explained hereinafter.

It is noted for example that a trapezoidal cross section is employed rather than a simple triangular cross section to provide an increased ratio of collector surface area to absorber surface area. The additional volume, defined by volume 14, is filled with a material of higher index of refraction than that of volume 16 in order to direct the radiation incident upon volume 14 from the atmosphere and from volume 16 onto the absorber surface, and more particularly to provide total internal reflection for radiation travelling from volume 14 towards volume 16 at the interface between the volumes. It is appreciated that any desired number of volumes having differing indices of refraction may be employed in combination to define the radiation pathway from the atmosphere to the absorber surface.

Reflecting mirrors 22 and 24 may be separate from volume 16 or may be coatings formed thereon. Alternatively reflecting mirrors 22 and 24 may be omitted.

Considering the geometry of the exemplary solar collector configuration of FIGS. 1 and 2 it is appreciated that the broadest surface is oriented such that the perpendicular thereto faces the median position of the sun during the day and the arc described by the sun during the day defines a plane perpendicular to the longitudinal axis 30 of the collector.

For the purposes of illustration and description, the surface facing the median location of the sun is identified by reference numeral 32, its length is termed L and its overall width is 2B. The area of the facing surface is given by:

$$A = L \times 2B \qquad (1)$$

The width of each of solar absorber plates 10 and 12 is termed b and their length is L so that the total area of the absorber surfaces is given by:

$$a = 2 \times (L \times b) \quad (2)$$

The solar radiation intensity on the absorber surface is given by:

$$S_i = I A \eta_r \cos(\theta) 1/a \quad (3)$$

where I is the global radiation including both direct radiation and diffused radiation;

$\eta_r$ is the optical efficiency of the collector, a factor which takes into account reflection losses due to the absence of total internal reflection and $\theta$ is the angle between the position of the sun at any time and the plane parallel to the axis 30 and to the normal to the facing surface.

It is desired to maximize the useful energy produced by the collector, which is given by:

$$Q_u = F_R a (S_i - U_L (T_{liq} - T_{amb})) \quad (4)$$

Where
$F_R$ is a constant
$U_L$ is a coefficient representing convection losses.
$T_{liq}$ is the temperature of the liquid adjacent the absorber surface;
$T_{amb}$ is the atmospheric temperature.

It may be appreciated that by maximizing the ratio of B/b, the geometrical concentration ratio of the apparatus is maximized. It will now be shown that there exists a trade-off between the maximization of B/b and the maximization of the amount of radiation which is subject to total internal reflection within volumes 14 and 16.

The critical angle $\theta$ for total internal reflection between bodies of different indices of reflection is given by Snell's law:

$$\theta = \mathrm{Inv}\sin \frac{\text{index of refraction of body } A}{\text{index of refraction of body } B} \quad (5)$$

where the radiation is travelling from body B to body A and the index of refraction of B is greater than the index of refraction of A.

Thus in the case where body A is air, whose index of refraction is equal to unity, the greater the index of refraction of body B the larger the critical angle.

If $\alpha$ is the acute angle between the facing and underside surfaces 32 and 18, it may be appreciated that:

$$2\alpha = \theta + \theta_2 \quad (6)$$

where $\theta_2$ is the maximum permissible azimuth angle for which total internal reflection will be achieved.

Thus in order to determine the values of $\alpha$ and $\theta_2$ which provide a maximum $Q_u$ for a given location, the values for solar radiation intensity for various azimuthal angles through the day for each given location must be considered. Such values are known in the literature.

Thus for example it has been found that for a location in Ohio U.S.A. an $\alpha$ of 30° provides a maximum amount of useful energy over an entire day. It is appreciated that each given location, having a different intensity pattern for solar radiation as a function of azimuthal angle of the sun's position, has a different preferred angle $\alpha$.

Figure 3:
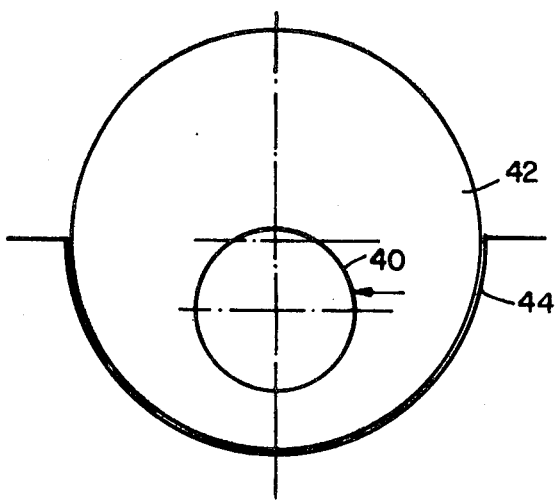
FIGS. 3, 4 and 5 are sectional illustrations of alternative embodiments of solar energy collection apparatus constructed and operative in accordance with the present invention.
Figure 4:
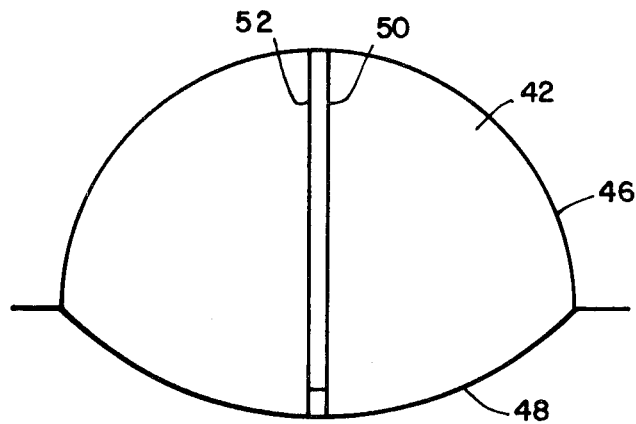
Figure 5:
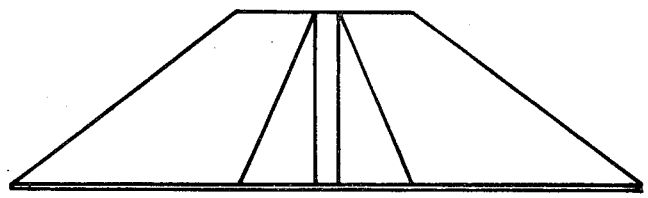

Reference is now made to FIGS. 3, 4 and 5 which illustrate in cross-sectional illustration, alternative embodiments of the invention. FIG. 3 shows a collector of circular cross section comprising an absorber surface 40 of circular cross section which is disposed within a volume 42 containing a material such as water which has desired characteristics of total internal reflection, as described hereinabove. The absorber surface 40 may be arranged in the center of the cross section of volume 42 or alternatively, off center, as illustrated. A mirror surface or coating 44 may be provided on a portion of the outer surface of volume 42 for providing desired reflection onto the absorber surface. Alternatively, this may be omitted.

FIG. 4 illustrates an alternative embodiment of the invention in which volume 42 defines facing and back surfaces 46 and 48 of differing cross sectional radii. In this embodiment, a pair of planar absorber surfaces 50 and 52 are employed, and a heat absorbing fluid is circulated in association therewith.

FIG. 5 illustrates a further alternative embodiment of the invention in which a geometry substantially similar to that of FIGS. 1 and 2 is employed in an upside down orientation, such that the solar energy receiving surface is defined by a plurality of surfaces angled with respect to each other and the bottom surface, which may be provided with a reflective coating is flat.

Reference is now made to FIGS. 6–8 which illustrate a preferred embodiment of the present invention. In the embodiment of FIGS. 6 and 7, elongate element 60 of uniform generally triangular cross section is provided. Element 60 typically comprises a material having an index of refraction greater than that of air and is typically formed of glass or of a generally clear plastic such as polycarbonate. According to one embodiment of the invention, element 60 is a unitary integrally formed element which is formed with an elongate bore 62 of generally uniform rounded rectangular cross section. Disposed in bore 62 is a solar energy absorber plate 64, which typically comprises a strip of metal or of any other suitable material having opposite elongate side surfaces 66, each of which is preferably formed with a solar energy selective coating, providing low emissivity and high absorptivity. The selective coating may be one of a number of known selective coatings and may comprise, for example, black paint a nickel oxide coating.

Solar energy absorbing surfaces 66 are normally disposed in spaced relationship to the inner adjacent walls 68 of bore 62, along at least most of the area thereof, with the possible exception of areas adjacent the top and bottom edges of plate 64. The volume thus defined between each of surfaces 66 and respective adjacent walls 68 defines a pair of channels 70, which may or may not be in communication with each other, for the passage of heat transfer fluid through bore 62 in thermal communication with surfaces 66. The purpose of the passage of this heat transfer fluid is to receive heat absorbed by surfaces 66 and to transfer it to utilization apparatus, not shown, such as a steam producing boiler.

The heat transfer fluid may be any desired fluid and may be, for example, water, oil or any other suitable fluid. Circulation of the fluid may be produced by thermosyphonic action or by means of a pump or any other suitable driving means.

According to an alternative embodiment of the invention, instead of being formed as a unitary integrally formed element, element 60 may be formed of two half elements 72, each having the generaly configuration illustrated in FIG. 8. Half elements 72 may be joined at their respective seams 74 and 76 by adhesive or any other suitable bonding means for providing the element 60 shown in FIGS. 6 and 7.

Similarly to the apparatus of FIG. 1, the element 60 defines symmetrical generally triangular total internal reflection elements 80 and 82 each operating with one of the two solar absorbing surfaces 66. Each element 80 defines incident surface 84 which is arranged to lie perpendicular to surface 66 and to have a surface area greater than the surface area of surface 66. Each element 80 also defines an adjacent surface 86 which is defined by wall 68 of bore 62 and a reflective surface 88, which may be provided by a mirror or by a reflective coating, as necessary.

Typical cross sectional dimensions of the apparatus of FIGS. 6, 7 and 8 are total width of two incident surfaces about 80 mm, total maximum thickness at bore 62 from incident surface to junction of reflective surfaces 88, about 20 mm, total width of absorbing plate 64 about 19 mm.

It is noted that the solar absorbing plate 64 is substantially surrounded by element 60, thus providing thermal insulation thereto.

It will be appreciated by persons skilled in the art that the invention is not limited to any particular geometry or arrangement of absorber surfaces or number of volumes of differing index of refraction. The scope of the present invention is defined only by the claims which follow:

I claim:

1. Non-focusing solar energy concentration apparatus comprising:
    a solar energy absorbing plate defining first and second parallel back-to-back solar energy absorbing surfaces having low emissivity characteristics and arranged in communication with fluid flowing adjacent thereto for heat transfer to said fluid;
    solar energy transmissive material disposed adjacent said first and second parallel absorbing surfaces, said solar energy transmissive material defining first and second incident surfaces disposed on opposite sides of said solar energy absorbing plate and arranged to receive incident radiation from the sun, each of said first and second incident surfaces having a surface area which is greater than the surface area of each of said first and second solar energy absorbing surfaces, the solar energy transmissive material also defining first and second adjacent surfaces disposed in spaced adjacent relationship to said first and second parallel absorbing surfaces for transmitting radiation thereto, the separations between said first and second adjacent surfaces and said first and second absorbing surfaces defining a channel for passage of fluid therebetween;
    said first and second incident surfaces lying perpendicular to said first and second absorbing surfaces;
    said transmissive material also defining first and second reflecting surfaces operative to reflect radiation incident at said first and second incident surfaces and having an index of refraction and a configuration selected to provide total internal reflection at said first and second incident surfaces of radiation incident on said incident surfaces within a predetermined angular range of incident radiation relative to said first and second absorbing surfaces;
    said plate being surrounded externally along said absorbing surfaces by said transmissive material, thus providing thermal insulation for said plate.

2. Apparatus according to claim 1 and wherein said transmissive material is formed as a single unit defining a central bore in which said plate is located and which defines said channel.

3. Apparatus according to claim 1 and wherein said transmissive material is formed of two identical halves, each of a generally triangular configuration.

4. Apparatus according to any of claims 1-3 and wherein the overall cross sectional dimensions of approximately 80 mm total overall width of said first and second incident surfaces and approximately 20 mm width of said absorbing plate.

5. Apparatus according to claim 1 and also comprising reflector means associated with a surface of said transmissive material for directing radiation towards said absorbing surface.

* * * * *